United States Patent [19]
Kitayama et al.

[11] Patent Number: 5,490,685
[45] Date of Patent: Feb. 13, 1996

[54] BABY CARRIAGE

[75] Inventors: Tadashi Kitayama, Hyogo; Ichiro Onishi, Osaka, both of Japan

[73] Assignee: Aprica Kassai Kabushikikaisha, Osaka, Japan

[21] Appl. No.: 255,099

[22] Filed: Jun. 7, 1994

[30] Foreign Application Priority Data

Jun. 16, 1993 [JP] Japan ................. 5-032413 U

[51] Int. Cl.⁶ .................................... B62B 7/04
[52] U.S. Cl. ............. 280/47.38; 280/642; 280/644; 280/658; 280/47.4; 297/354.12; 24/585
[58] Field of Search .................. 280/47.38, 47.4, 280/642, 644, 650, 658; 297/354.12, 377; 2/336, 337, 338; 24/582, 583, 584, 585

[56] References Cited

U.S. PATENT DOCUMENTS

| | | | |
|---|---|---|---|
| 1,003,907 | 9/1911 | Hoffman | 24/585 |
| 4,577,375 | 3/1986 | Beaussant | 24/585 |
| 4,727,630 | 3/1988 | Alan | 24/585 |
| 4,805,928 | 2/1989 | Nakao et al. | 280/650 |
| 4,916,779 | 4/1990 | Terada et al. | 24/585 |
| 5,195,770 | 3/1993 | Ishikura | 280/650 |

FOREIGN PATENT DOCUMENTS

| | | | |
|---|---|---|---|
| 286603 | 2/1953 | France | 24/585 |
| 3-8968 | 1/1991 | Japan | |
| 21646 | 7/1897 | United Kingdom | 24/585 |

Primary Examiner—Margaret A. Focarino
Assistant Examiner—Min S. Yu
Attorney, Agent, or Firm—W. G. Fasse; W. F. Fasse

[57] ABSTRACT

A belt assembly is arranged on a back side of a backrest of a baby carriage, so that the angle of inclination of the backrest may be changed by adjusting of the length of the belt assembly. The belt assembly includes a first belt, a second belt, and a buckle which is attached to an end of the first belt and which has the second belt passing therethrough. The second belt has on its first major surface a plurality of engaging cavities. The buckle holds an operating member, which is cross-directionally or laterally movable across the second belt, and which is urged by a spring to move downwardly. The operating member is provided with engaging projections, which can selectively engage the engaging cavities. The length of the belt assembly is fixed when the engaging projections engage the engaging cavities, while the length of the belt assembly is rendered changeable when the former disengage from the latter. Thus, an adjusted length of the belt assembly can be reliably maintained by engagement of the engaging projections in the engaging cavaties.

19 Claims, 6 Drawing Sheets

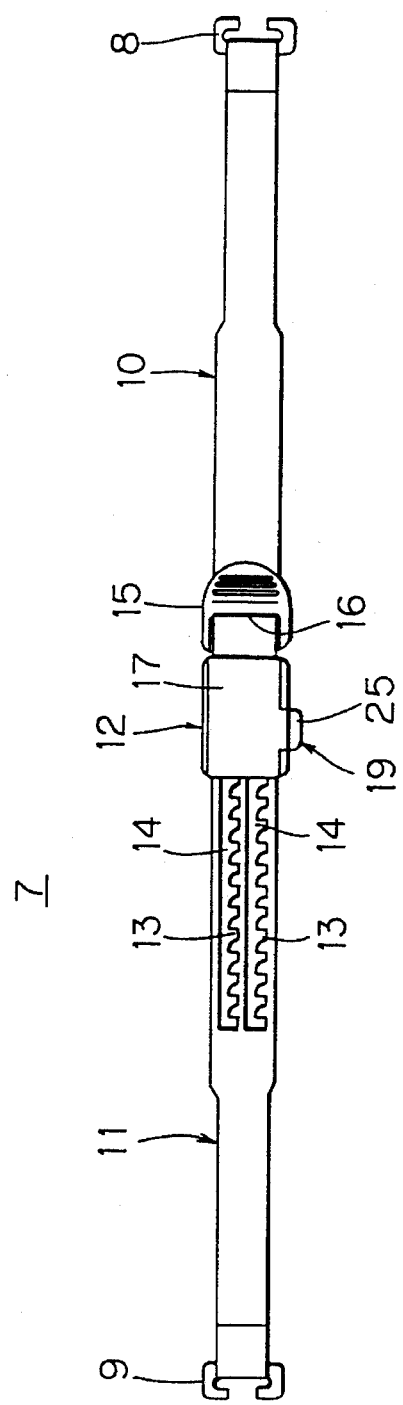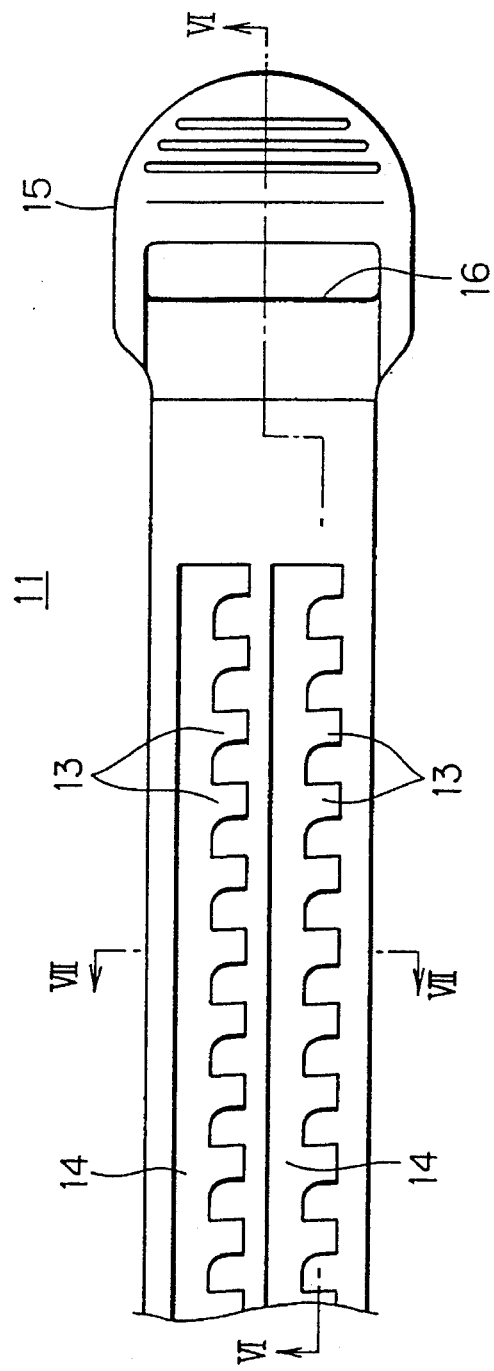

11

BABY CARRIAGE

BACKGROUND OF THE INVENTION

1. Field of the Invention

The present invention relates to a baby carriage, and more particularly, it relates to an improvement in a mechanism for changing the angle of inclination of a backrest portion of a seat provided in a baby carriage.

2. Description of the Background Art

At present, a baby carriage generally comprises a seat. In such a baby carriage, the angle of inclination of a backrest portion is generally changeable. Such a baby carriage must be reduced in weight, and hence it is desirable to simplify the structure of a mechanism for changing the angle of inclination of the backrest portion.

For example, Japanese Utility Model Application Laying-Open No. 3-8968 (1991) in the name of the assignee describes a mechanism for changing the angle of inclination of a backrest portion, which can be implemented in a simple structure. In a baby carriage described in this Japanese Laying-Open Publication, a belt assembly is arranged on a back side of the backrest portion for supporting the same, so that the angle of inclination of the backrest portion can be changed by adjusting the length of the belt assembly.

The length of the belt assembly is adjusted in the following manner: The belt assembly comprises a first belt having an end which is coupled to one of two push rods, a second belt having an end which is coupled to the other push rod, and a buckle which is coupled to another end of the first belt and provided with a belt passage for passing the second belt therethrough. The buckle is rotatably provided with a stopper having a cam surface which frictionally engages with the second belt positioned in the belt passage, when the rotatable stopper is brought into a prescribed rotational position for inhibiting the buckle and the second belt from relative movement.

The aforementioned mechanism for changing the angle of inclination of the backrest portion is simple in structure and operation, and adapted to fix or secure the second belt which is positioned in the belt passage of the buckle by frictional engagement, whereby the length of the belt assembly can advantageously be adjusted in a stepless manner. Thus, the angle of inclination of the backrest portion can be adjusted in a stepless manner.

However, although the aforementioned frictional engagement for fixing the second belt advantageously enables stepless adjustment, fixation of the second belt is inferior in reliability. In other words, the second belt cannot be reliably fixed or secured when the frictionally engaging portion becomes worn.

SUMMARY OF THE INVENTION

Accordingly, an object of the present invention is to provide a baby carriage having a mechanism for changing the angle of inclination of a backrest portion with a belt assembly, which is so improved as to reliably maintain an adjusted length of the belt assembly.

The baby carriage according to the present invention comprises a seat having a seat portion and a backrest portion upwardly extending from a rear end of the seat portion so that the angle of inclination thereof is changeable, first and second fixed members which are positioned on both sides of the seat respectively, and a belt assembly which is arranged on a back side of the backrest portion for supporting the same so that respective ends thereof are coupled to the first and second fixed members respectively. The length of the belt assembly is adjustable for changing the angle of inclination of the backrest portion. This belt assembly comprises a first belt having an end which is coupled to the first fixed member, a second belt having an end which is coupled to the second fixed member, and a buckle which is coupled to the other end of the first belt and provided with a belt passage for passing the second belt therethrough. In order to solve the aforementioned technical problem, the present invention includes the following particular structure.

The second belt is provided on its first major surface with a serrated step portion that provides a plurality of engaging cavities distributed longitudinally along the belt. On the other hand, the buckle holds an operating member that crosses the belt passage on the first major surface of the second belt and is cross-directionally or laterally movable along the second belt, and is provided with a spring for urging the operating member to move in a first direction. Further, the operating member is provided with an engaging projection that engages with any one of the plurality of engaging cavities when the projection is urged by the spring to move in the first direction, and a press operation part that projects from the buckle for driving the operating member in a second direction.

According to the present invention, the adjusted length of the belt assembly is maintained by the operating member, which is urged by the spring to move in a first direction, and the engaging projection provided on the operating member, which engages with any one of the plurality of engaging cavities provided in the second belt.

When the press operation part provided on the operating member is manually pressed against the elasticity of the spring, the engaging projection disengages from the engaging cavity so that the second belt is freely movable with respect to the buckle. In this state, the length of the belt assembly is adjusted to adjust the angle of inclination of the backrest portion. After this adjustment is completed, the pressing force may be released from the press operation part so that the operating member, which is urged by the spring moves to bring the engaging projection into engagement with a desired one of the engaging cavities.

According to the present invention, as hereinabove described, the adjusted length of the belt assembly is maintained by the engaging projection, which is provided on the operating member urged by the spring, engaging with one of the engaging cavities provided in the second belt, whereby it is possible to reliably maintain this length. This adjustment is not maintained by a frictional engagement dissimilarly to the prior art, whereby the adjusted length can be reliably maintained regardless of wear.

According to the present invention, further, the length of the belt assembly can be adjusted substantially by simply pressing the press operation part of the operating member and then eliminating or removing the pressing force, whereby the length can be easily adjusted and then again fixed at the new desired adjustment.

According to the present invention, further, the engaging cavities are defined by the serrated step portion which is formed on the first major surface of the second belt, and the operating member is held by the buckle to cross the belt passage on the first major surface of the second belt so as to be cross-directionally movable along the second belt, whereby the buckle portion can be relatively reduced in thickness. Thus, it is possible to prevent the buckle from protruding excessively backwards from the back side of the backrest portion of the baby carriage.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a front elevational view independently showing a belt assembly 7 which is provided in the baby carriage 1 shown in FIG. 1;

FIG. 5 is a front elevational view showing a part of a second belt 11 which is included in the belt assembly 7 shown in FIG. 3;

DESCRIPTION OF THE PREFERRED EMBODIMENTS

Figure 1:
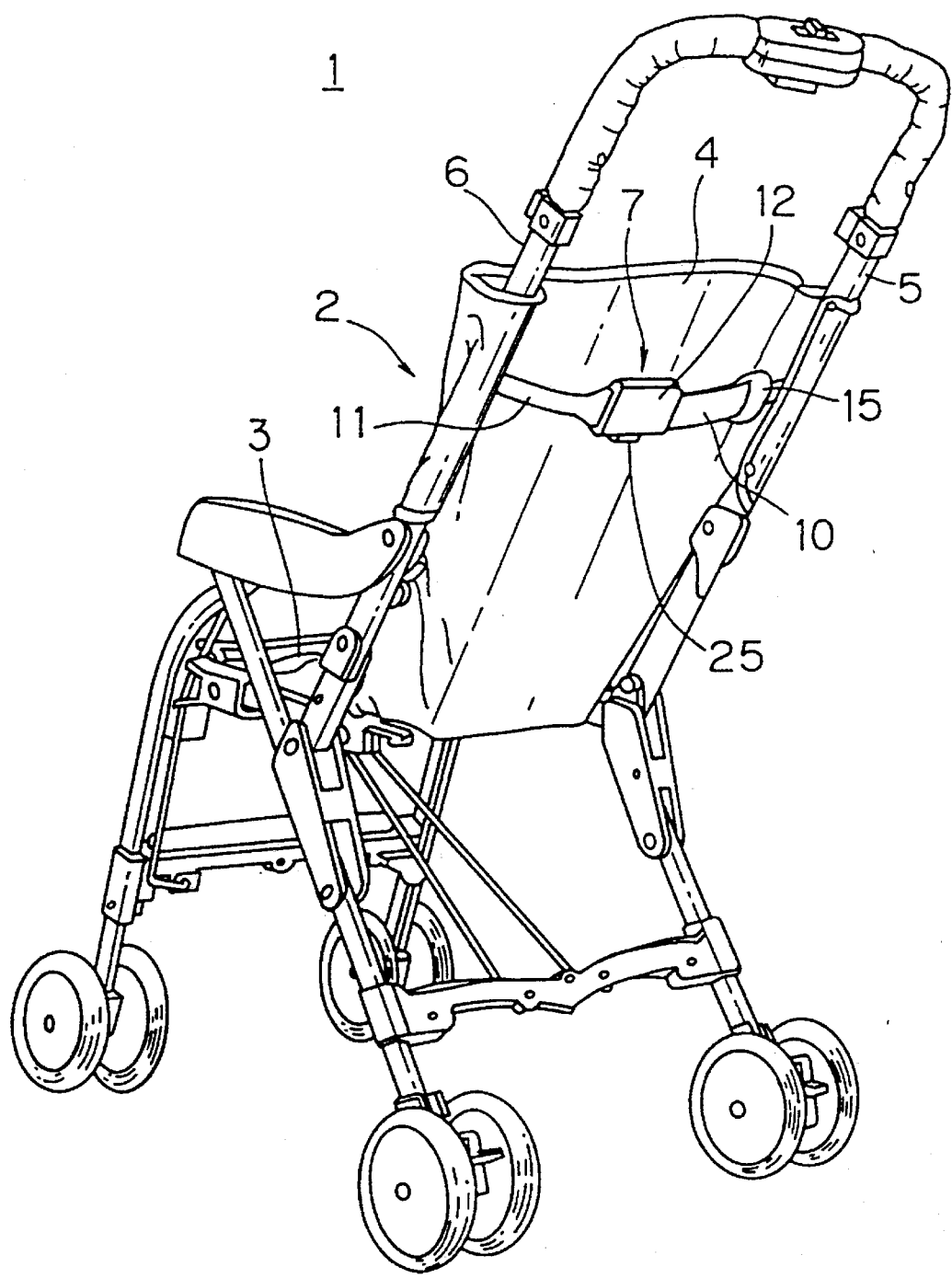
FIG. 1 is a perspective view showing a baby carriage 1 according to an embodiment of the present invention as viewed from a back side.
Figure 2:
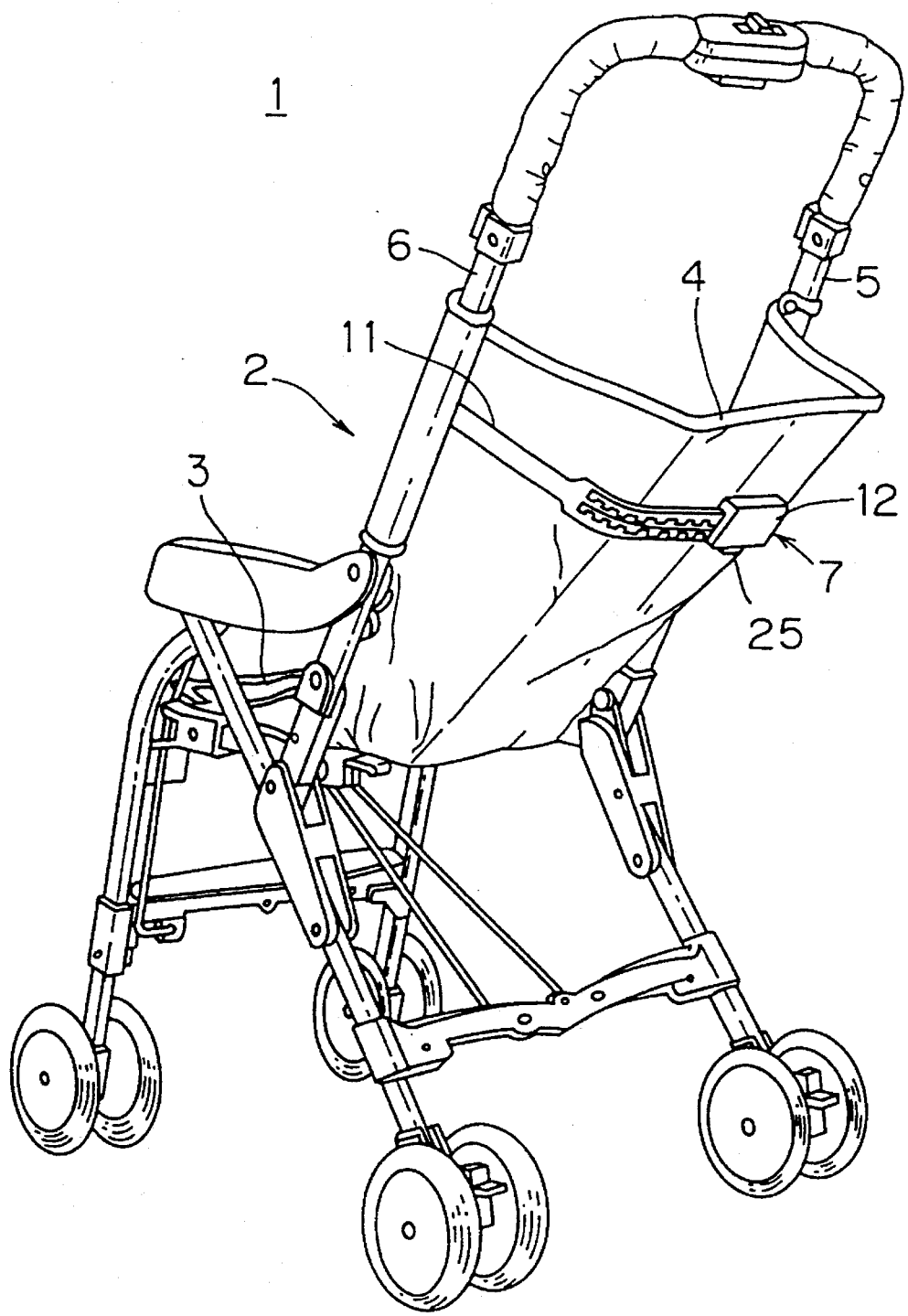
FIG. 2 is a perspective view corresponding to FIG. 1, showing a backrest portion 4 in a further inclined state.

FIGS. 1 and 2 are perspective views showing a baby carriage 1 according to an embodiment of the present invention as viewed from a back side.

The baby carriage 1 comprises a seat 2, which is provided with a seat portion 3 and a backrest portion 4 upwardly extending from a rear end of the seat portion 3 so that the angle of inclination thereof is changeable. The baby carriage 1 further comprises first and second fixed members 5 and 6 which are positioned on both sides of the seat 2 respectively. According to this embodiment, the fixed members 5 and 6 are provided by push rods respectively. The fixed members 5 and 6 may alternatively be formed by other members which are equivalent to such push rods.

The backrest portion 4 is made of a flexible sheet material such as cloth, and provided with a core member (not shown) only along its cross-directional central portion. Both side portions of the backrest portion 4 are wound on the fixed members 5 and 6, and are thus coupled to these fixed members 5 and 6 respectively. When the backrest portion 4 is relatively raised up as shown in FIG. 1, both side portions of the cloth of the backrest portion 4 are loosened. When the backrest portion 4 is rearwardly inclined as shown in FIG. 2, on the other hand, the both side portions of the cloth of the backrest portion 4 are relatively stretched or extended to a taut position.

Figure 4:
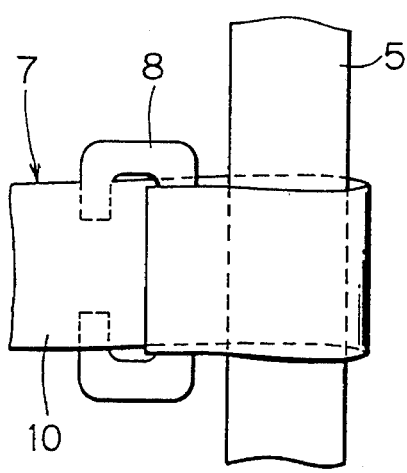
FIG. 4 is a front elevational view showing an end of the belt assembly 3 appearing in FIG. 3 which is coupled to an enlarged fixed member 5.

As shown in FIGS. 1 and 2, a belt assembly 7 is provided for changing the angle of inclination of the backrest portion 4. The belt assembly 7 is arranged on a back side of the backrest portion 4, for supporting the same. FIG. 3 independently shows the belt assembly 7. As shown in FIG. 3, C-shaped fasteners 8 and 9 are mounted on both ends of the belt assembly 7 respectively. The end portions of the belt assembly 7 are coupled to the fixed members 5 and 6 through the fasteners 8 and 9 respectively. FIG. 4 shows the fastener 8, which couples one end portion of the belt assembly 7 to the fixed member 5. As shown in FIG. 4, the end portion of the belt assembly 7 is put round the fixed member 5, and a part of the belt assembly 7 is thereafter received in the fastener 8 to achieve the coupling.

The length of the belt assembly 7 is so adjustable as to change the angle of inclination of the backrest portion 4. A structure for enabling such adjustment of the length is now described in detail.

The belt assembly 7 comprises a first belt 10 which holds the aforementioned fastener 8 on its first or fixed end to be coupled to the first fixed member 5, a second belt 11 which holds the aforementioned fastener 9 on its first or fixed end to be coupled to the second fixed member 6, and a buckle 12 which is connected to a second or free end of the first belt 10.

Figure 7:
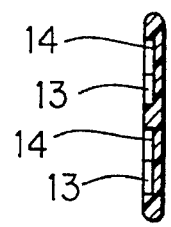
FIG. 7 is a sectional view taken along the line VII—VII in FIG. 5.
Figure 6:
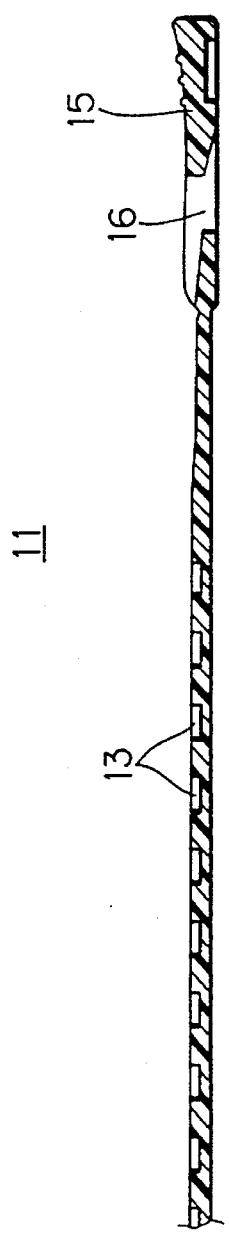
FIG. 6 is a sectional view taken along the line VI—VI in FIG. 5.

FIG. 5 shows a part of the second belt 11. FIGS. 6 and 7 are sectional views taken along the lines VI—VI and VII—VII in FIG. 5 respectively.

The second belt 11 is provided on its first major surface with recessed engagement grooves or serrated step portions 14 each having a plurality of serrated steps forming a plurality of engaging cavities 13 distributed longitudinally along the second belt 11. According to this embodiment, two such step portions 14 are formed to arrange the plurality of engaging cavities 13 in two lines.

The second belt 11 is provided with a tongue plate 15 on a second end which is opposed to that provided with the fastener 9. This tongue plate 15 is provided with a slot or belt passage 16 through which the first belt 10 may pass as shown in FIG. 3, for example.

Figure 8:
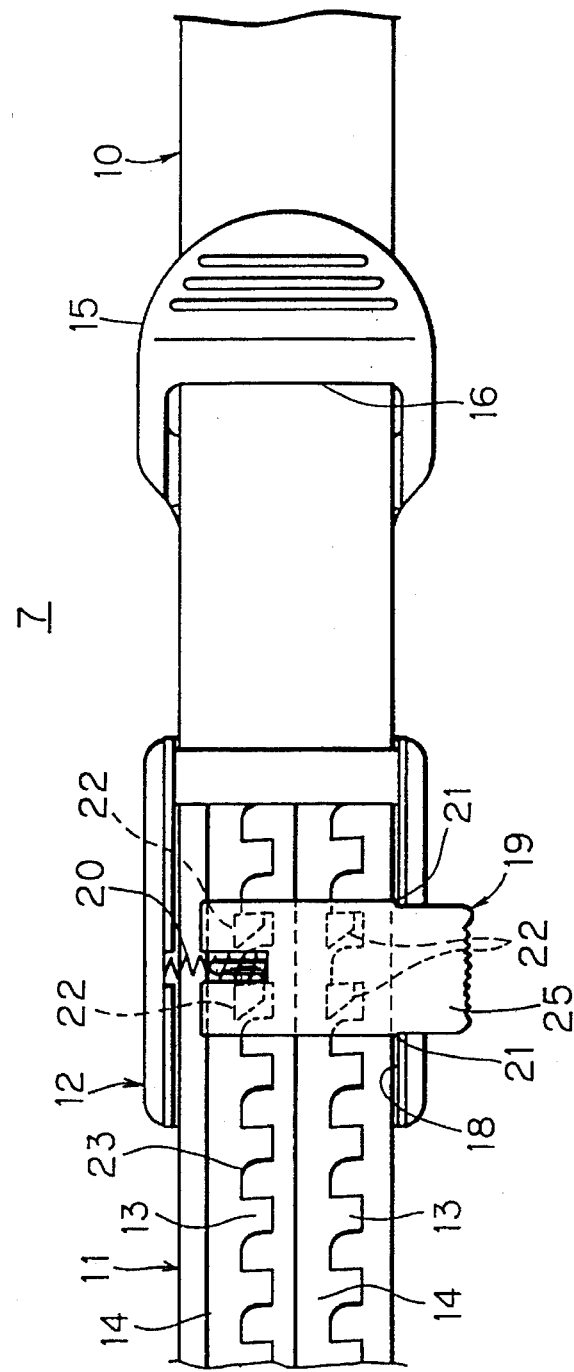
FIG. 8 is an enlarged front elevational view showing a portion, provided with a buckle 12, of the belt assembly 7 appearing in FIG. 3.

FIG. 8 shows a structure around the buckle 12, which is provided on the belt assembly 7 shown in FIG. 3, in an enlarged manner. For the sake of clarity, a cover 17 (see FIG. 3) for the buckle 12 has been omitted in FIG. 8. Referring to FIG. 8, further, the relative positional relation between the first and second belts 10 and 11 is different from that shown in FIG. 3. Namely, the belt assembly 7 has been shortened, so that a longer portion of the first belt 10 and the second belt 11 overlap in the area between the tongue plate 15 and the buckle 12.

Referring mainly to FIG. 8, the buckle 12 has a buckle body provided with a belt passage 18 for passing the second belt 11 therethrough. The second belt 11 which is passed through this belt passage 18 is positioned behind the first belt 10 in FIG. 8, so that only a forward end of the tongue plate 15 is positioned in front of the first belt 10. In other words, the first belt 10 and the second belt 11 overlap each other in an overlapped region between the buckle 12 and the tongue plate 15, with the first belt 10 overlapping and facing the first major surface of the second belt 11.

The buckle 12 holds an operating member 19 to cross the belt passage 18 on the first major surface of that is to say in front of in the view of FIG. 8, the second belt 11 provided with the engaging cavities 13. This operating member 19 is cross-directionally or laterally movable across the second belt 12. A guide member (not shown) is provided on the cover 17 for guiding such cross-directional movement of the operating member 19 across along the second belt 11. The buckle 12 is further provided with a spring 20 which urges the operating member 19 to move in a first direction. The operating member 19 is urged by the spring 20 to move downwardly in FIG. 8. Shoulder portions 21 are formed on the operating member 19 for defining a terminating end of such downward movement of the operating member 19. These shoulder portions 21 are adapted to engage with parts of the buckle 12.

Figure 9:
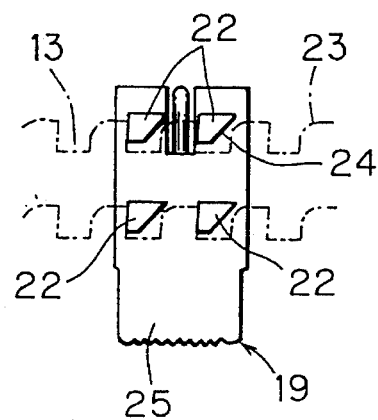
FIG. 9 is a rear elevational view of an operating member 19 shown in FIG. 8.

The operating mender 19 is provided with engaging projections 22 which engage with some of the plurality of engaging cavities 13 upon downward movement of the operating member 19 urged by the spring 20. These engaging projections 22, which are shown dashed or broken lines in FIG. 8, project from the back surface of the operating member 19. Two such engaging projections 22 are provided for each line of the engaging cavities 13. The engaging cavities 13 and the engaging projections 22 are preferably provided with rounded surfaces 23 and inclined surfaces 24 (see also FIG. 9), to facilitate smoother relative movement of the second belt 11 and the buckle 12 for reducing the length of the belt assembly 7.

Figure 10:
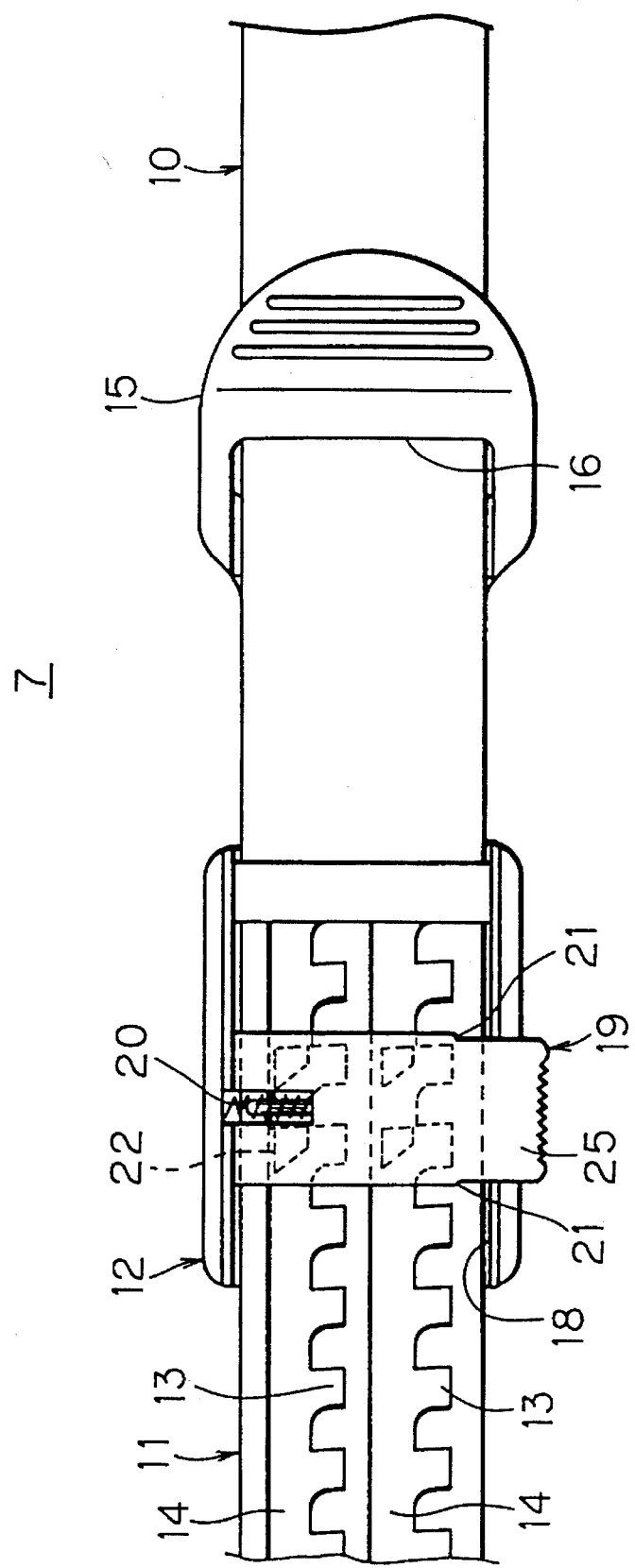
FIG. 10 is an enlarged front elevational view corresponding to FIG. 8, showing the operating member 19 in an upwardly moved state.

A lower end of the operating member 19 shown in FIG. 8 projects from the buckle 12, to provide a press operation part 25, such as a manually operable squeeze or push button. FIG. 10 shows a depressed state of the press operation part 25. When the press operation part 25 is depressed as shown in FIG. 10, the engaging projections 22 disengage from the engaging cavities 13. Thus, the second belt 11 is freely movable with respect to the buckle 12. When the pressing force is eliminated or removed from the press operation part 25, on the other hand, the operating member 19 moves downwardly due to the biasing force of the elasticity of the spring 20 as shown in FIG. 8, so that the engaging projections 22 engage with the engaging cavities 13. In this state, the second belt 11 is inhibited from movement with respect to the buckle 12, thereby fixing the length of the belt assembly 7.

In the baby carriage 1 according to this embodiment, when the press operation part 25 is depressed when the belt assembly 7 is in the state shown in FIG. 1 to allow the length of the belt assembly 7 to be increased and thereafter the press operation part 25 is released, for example, the backrest portion 4 has been further inclined in accordance with the increased length of the belt assembly 7. On the other hand, when the buckle 12 is held and the press operation part 25 is pressed while the tongue plate 15 is pulled in a direction away from the buckle 12 in the state shown in FIG. 2, the length of the belt assembly 7 is reduced so that the backrest portion 4 is raised up in accordance with the reduced length of the belt assembly 7.

In the aforementioned embodiment, the second belt 11 extends regularly, flatly and smoothly along the first belt 10 due to the tongue plate 15 which is provided on the end of the second belt 11. If such an advantage is not desired, however, the end of the second belt 11 may hang down from the buckle 12 and may omit the tongue plate 15.

In the aforementioned embodiment, further, the first and second belts 10 and 11 and the buckle 12 can be formed by resin moldings. Thus, it is possible to freely select colors of these members.

What is claimed is:

1. A baby carriage comprising:
   a seat having a seat portion and a backrest portion upwardly extending from a rear end of said seat portion so that said backrest portion has an angle of inclination that is changeable;

first and second fixed members positioned at two sides of said seat respectively; and a belt assembly arranged on a back side of said backrest portion in supporting contact with said backrest portion, wherein said belt assembly has a length that is adjustable for changing said angle of inclination of said backrest portion;

wherein said belt assembly includes a first flexible belt having first and second ends wherein said first end is coupled to said first fixed member, a second flexible belt having first and second ends wherein said first end is coupled to said second fixed member, and a buckle coupled to said second end of said first belt wherein said buckle has a belt passage through which said second belt can be passed, wherein said second belt has a first major surface and longitudinal edges along said surface and a recessed serrated step portion is formed as a recess in said first major surface, and a plurality of engaging cavities are formed in said serrated step portion longitudinally along said second belt between said longitudinal edges, wherein said buckle includes an operating member movably held in said buckle to extend across said belt passage on said first major surface of said second belt, wherein said operating member is laterally slidable across said second belt, and said buckle further includes a spring arranged to urge said operating member to move in a first direction, and wherein said operating member has an engaging projection that projects into said recessed serrated step portion and is adapted to move within said serrated step portion to engage with any one of said plurality of engaging cavities upon movement of said operating member under urging of said spring in said first direction, and said operating member further includes a press operating part projecting from said buckle and adapted to be pressed to drive said operating member in a second direction.

2. The baby carriage in accordance with claim 1, wherein said first and second fixed members are push rods of said baby carriage adapted to receive a manual pushing force.

3. The baby carriage in accordance with claim 1, wherein said backrest portion includes a flexible sheet material including two side portions along lateral edges of said sheet material, and wherein said two side portions of said backrest portion are coupled to said first and second fixed members respectively.

4. The baby carriage in accordance with claim 1, wherein said first and second fixed members are in the form of rods respectively, and further comprising C-shaped fasteners mounted at said first ends of said first and second belts respectively, wherein said first ends of said first and second belts extend around said first and second fixed members and are received in said fasteners respectively, to be coupled to said first and second fixed members respectively.

5. The baby carriage in accordance with claim 1, wherein said engaging cavities are arranged in a plurality of lines, and said operating member has a plurality of said engaging projection arranged in a configuration corresponding to each said line of said engaging cavities.

6. The baby carriage in accordance with claim 1, wherein said engaging cavities and said engaging projection each have a shape adapted to facilitate smoother relative movement of said belt and said buckle in a direction for reducing said length of said belt assembly.

7. The baby carriage in accordance with claim 6, wherein said shapes adapted to facilitate smoother relative movement include at least one surface selected from the group consisting of a rounded surface and an inclined surface.

8. The baby carriage in accordance with claim 1, further comprising a tongue plate having a slot for receiving said first belt, wherein said tongue plate is attached to said second end of said second belt.

9. A length-adjustable belt assembly on a baby carriage with a frame with first and second components, said belt assembly connected between the first component and the second component, said belt assembly comprising a first flexible belt having a fixed end adapted to be connected to the first component and a free end, a second flexible belt having a fixed end adapted to be connected to the second component and a free end, and a buckle connected to said free end of said first belt, wherein said second belt has first and second major surfaces and longitudinal edges along said surface, said first major surface has a recessed engagement groove formed therein to extend in a longitudinal direction of said second belt, said engagement groove includes serrated steps and engagement cavities distributed longitudinally along said recessed engagement groove, said buckle comprises a buckle body having a belt passage adapted to receive said second belt passing through said belt passage, and said buckle further comprises an operating member movably held in said buckle body to be slidable between an engagement position and a disengagement position in a lateral direction across said first major surface of said second belt in said belt passage, an engaging projection projecting from said operating member and reaching into said recessed engagement groove while being adapted to move within said recessed engagement groove to engage any one of said engagement cavities when said operating member is moved into said engagement position and to disengage from said engagement cavities when said operating member is moved into said disengagement position, and a spring arranged to apply an urging force to urge said operating member toward said engaging position.

10. The belt assembly of claim 9, further comprising a push button connected to said operating member and protruding from said buckle body and adapted to be manually depressed against said urging force of said spring.

11. The belt assembly of claim 9, wherein the first component and the second component are respective first and second push rods of the baby carriage, which further includes a backrest arranged substantially between two push rods, wherein said fixed ends of said first and second belts are adapted to be respectively connected to the two push rods so that said belt assembly is arranged to extend between the two push rods in supporting contact with a back surface of the backrest.

12. The belt assembly of claim 9, wherein said recessed engagement groove includes an unobstructed slide groove extending in said longitudinal direction of said second belt, wherein said engaging projection can freely slide longitudinally in said slide groove when said operating member is in said disengagement position, and wherein said engagement cavities extend laterally from said slide groove, with respective ones of said engagement cavities formed between respective adjacent pairs of said serrated steps, so that said engaging projection engages one of said engagement cavities and is prevented from sliding longitudinally by said serrated steps when said operating member is in said engagement position.

13. The belt assembly of claim 9, wherein said engaging projection is directly rigidly connected to said operating member, so that said engaging projection moves in said lateral direction when said operating member moves in said lateral direction.

14. The belt assembly of claim 9, wherein said serrated steps each comprise a rounded edge surface adapted to contact said engaging projection, and said engaging projection comprises an inclined surface adapted to contact one of said serrated steps.

15. The belt assembly of claim 9, wherein said recessed engagement groove is indented into said second belt.

16. The belt assembly of claim 9, wherein two of said recessed engagement grooves are formed in said first major surface of said second belt, wherein said two engagement grooves extend substantially parallel and adjacent to each other in said longitudinal direction of said second belt, and wherein said buckle comprises two of said engagement projections arranged to cooperate respectively with said two engagement grooves.

17. The belt assembly of claim 16, wherein each of said engagement grooves include a respective set of said serrated steps and said engagement cavities, and wherein each of said respective sets of said serrated steps and said engagement cavities has the same configuration.

18. The belt assembly of claim 9, further comprising a tongue plate attached to said free end of said second belt, wherein said tongue plate has a belt passage adapted to receive said first belt passing through said tongue plate.

19. The belt assembly of claim 18, wherein said first belt and said second belt overlap each other in an overlapped region between said buckle and said tongue plate, with said first belt facing and overlapping said first major surface of said second belt in said overlapped region.

* * * * *

UNITED STATES PATENT AND TRADEMARK OFFICE
CERTIFICATE OF CORRECTION

PATENT NO. : 5,490,685
DATED : February 13, 1996
INVENTOR(S) : Kitayama et al.

It is certified that error appears in the above-identified patent and that said Letters Patent is hereby corrected as shown below:

[57] ABSTRACT, line 18, replace "cavaties" by --cavities--.

In Col. 3, line 21, replace "an" by --a--;
 line 22, delete "enlarged";
 line 23, replace "a" (first occurrence) by --an enlarged--.

In Col. 4, line 63, after "say" insert --,--.

In Col. 5, line 11, replace "mender" by --member--;
 line 15, after "shown" insert --by--.

Signed and Sealed this

Twenty-first Day of May, 1996

Attest:

BRUCE LEHMAN

Attesting Officer      Commissioner of Patents and Trademarks